(12) United States Patent
Baqai et al.

(10) Patent No.: US 11,200,641 B1
(45) Date of Patent: Dec. 14, 2021

(54) NOISE REDUCTION WITH CLASSIFICATION-BASED CONTRAST PRESERVATION

(71) Applicant: Apple Inc., Cupertino, CA (US)

(72) Inventors: Farhan A. Baqai, Fremont, CA (US); Wu Cheng, Millbrae, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/580,501

(22) Filed: Sep. 24, 2019

Related U.S. Application Data

(60) Provisional application No. 62/737,494, filed on Sep. 27, 2018.

(51) Int. Cl.
| | | |
|---|---|---|
| *G06K 9/00* | (2006.01) | |
| *G06T 5/00* | (2006.01) | |
| *G06T 5/50* | (2006.01) | |
| *H04N 9/64* | (2006.01) | |
| *G06T 5/20* | (2006.01) | |

(52) U.S. Cl.
CPC .............. *G06T 5/002* (2013.01); *G06T 5/20* (2013.01); *G06T 5/50* (2013.01); *H04N 9/646* (2013.01); *G06T 2207/10024* (2013.01); *G06T 2207/20192* (2013.01)

(58) Field of Classification Search
CPC .. G06T 5/002; G06T 5/50; G06T 5/20; G06T 2207/10024; G06T 2207/20192; H04N 9/646
USPC .......................................................... 382/275
See application file for complete search history.

(56) References Cited

U.S. PATENT DOCUMENTS

| | | | |
|---|---|---|---|
| 2005/0058354 A1* | 3/2005 | Weintraub | G06T 5/10 |
| | | | 382/233 |
| 2005/0074163 A1* | 4/2005 | Shaked | H04N 1/6086 |
| | | | 382/162 |
| 2011/0235938 A1* | 9/2011 | Lin | G06T 5/002 |
| | | | 382/264 |
| 2011/0299769 A1* | 12/2011 | Leitao | G06T 5/10 |
| | | | 382/164 |
| 2017/0054976 A1* | 2/2017 | Li | H04N 19/117 |

* cited by examiner

*Primary Examiner* — Andrew M Moyer
(74) *Attorney, Agent, or Firm* — Fernando & Partners, LLP

(57) ABSTRACT

In one embodiment, a method includes obtaining an image comprising a plurality of pixels. The method includes determining, for a particular pixel of the plurality of pixels, a feature value. The method includes selecting, based on the feature value, a set of selected pixels from a set of candidate pixels in an image region surrounding the particular pixel. The method includes denoising the particular pixel based on the set of selected pixels.

19 Claims, 6 Drawing Sheets

NOISE REDUCTION WITH CLASSIFICATION-BASED CONTRAST PRESERVATION

CROSS-REFERENCE TO RELATED APPLICATIONS

This application claims priority to U.S. Provisional Patent App. No. 62/737,494, filed on Sep. 27, 2018, which is hereby incorporated by reference in its entirety.

TECHNICAL FIELD

The present disclosure relates generally to image processing, and in particular, to noise reduction of captured images with classification-based contrast preservation.

BACKGROUND

When an image is captured using a camera, particular in low-light conditions, the resulting image can include noise in addition to a representation to the captured scene. Further, noise artefacts can be introduced to an image by various compression methods or other processing. Accordingly, in various circumstances, denoising algorithms can be applied to an image to reduce the visibility of such noise.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
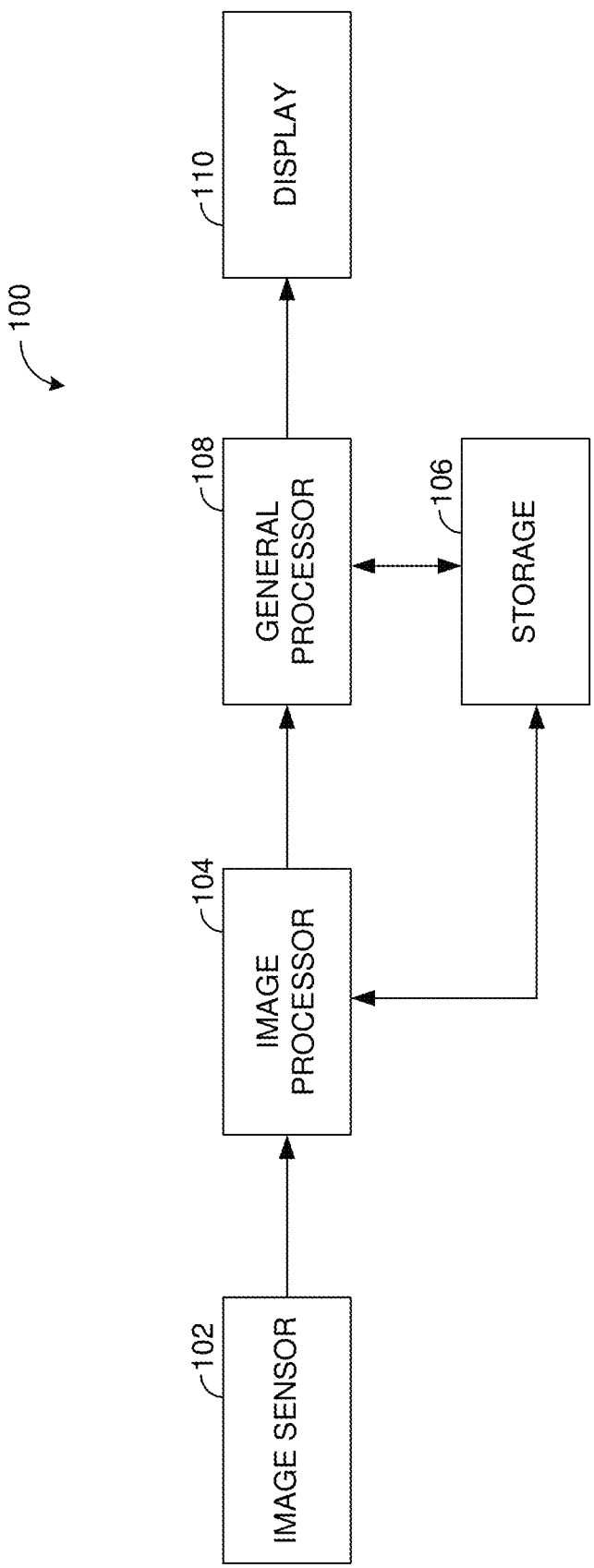
FIG. 1 is a functional block diagram of an electronic device including an image processor.

In accordance with common practice, various features shown in the drawings may not be drawn to scale, as the dimensions of various features may be arbitrarily expanded or reduced for clarity. Moreover, the drawings may not depict all of the aspects and/or variants of a given system, method or apparatus admitted by the specification. Finally, like reference numerals are used to denote like features throughout the figures.

DESCRIPTION OF EXAMPLE EMBODIMENTS

FIG. 1 is a functional block diagram of an electronic device 100. In various implementations, the electronic device 100 is a camera, a phone, a tablet, or a personal computer. The electronic device 100 includes an image sensor 102 that captures an image, an image processor 104 that performs pre-processing on the image, a general processor 108 that performs noise reduction on the image, storage 106 for storing the image in various states (with or without pre-processing and/or noise reduction), and a display 110 for displaying the image.

The image sensor 102 captures an image as raw image data. In various implementations, the image sensor 102 includes a CCD (charge-coupled device) image sensor or a CMOS (complementary metal-oxide semiconductor) image sensor. The image sensor is coupled to, and provides raw image data to, an image processor 104.

The image processor 104 receives the raw image data from the image sensor 102 and pre-processes the raw image data to produce pre-processed image data. In various implementations, the pre-processing includes, for example, converting a RAW image into an RGB image or YCbCr image. In various implementations, the pre-processing further includes gain adjustment, color enhancement, or filtering as described further below.

In various implementations, the image processor 104 stores the pre-processed image data in the storage 106, where it is retrieved by the general processor 108. The general processor 108 performs noise reduction on the pre-processed image data to produce processed image data. In various implementations, the processed image data is stored in the storage 106 or displayed on the display 110.

Figure 2:
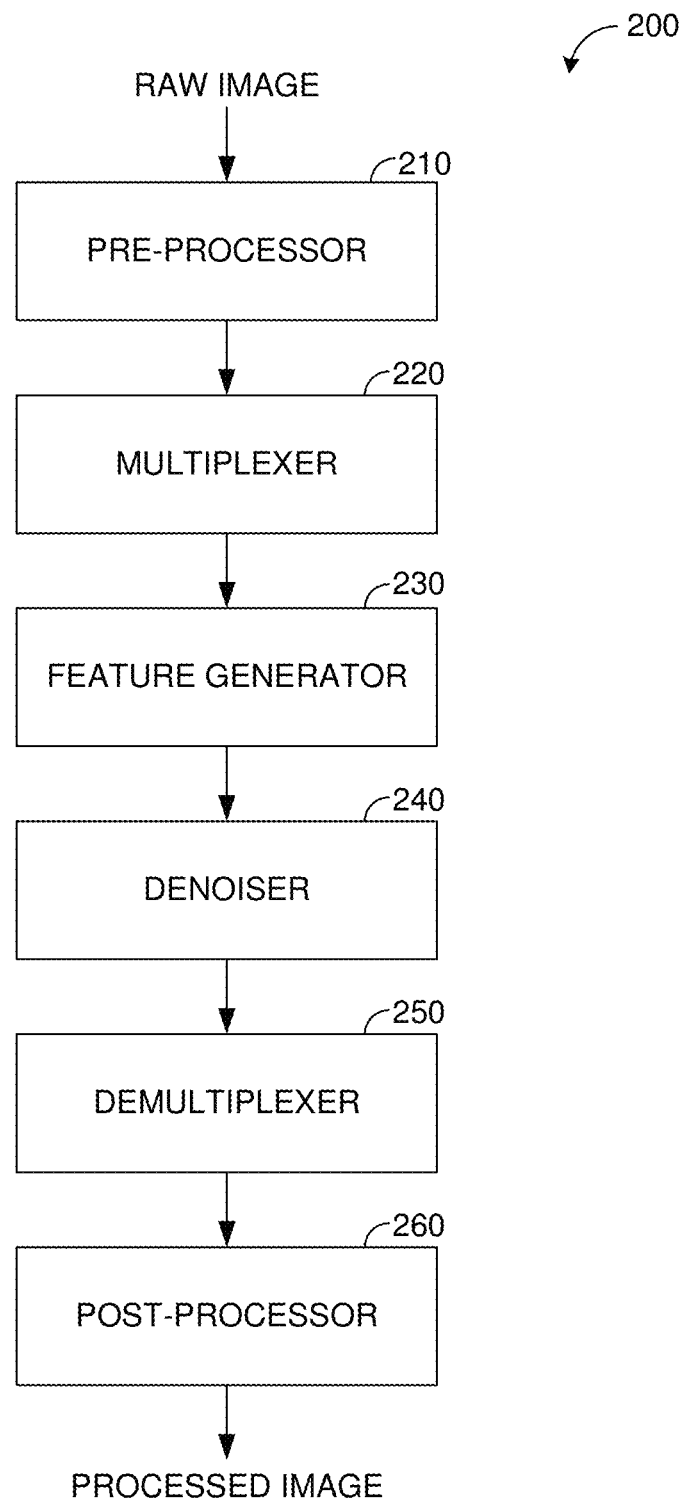
FIG. 2 is a functional block diagram of an image processing system in accordance with some implementations

FIG. 2 is a functional block diagram of an image processing system 200 in accordance with some implementations. The image processing system 200 receives a RAW image including a plurality of pixels arranged in matrix. The raw image can be received, for example, from an image sensor, such as the image sensor 102 of FIG. 1.

The raw image is fed into a pre-processor 210 that converts the RAW image into a color image including a plurality of color components, each color component including a plurality of pixels arranged in a matrix. In various implementations, the pre-processor 210 converts the RAW image into an RGB image including a red component, a green component, and a blue component. In various implementations, the pre-processor 210 converts the RAW image into a YCbCr image including a luma component, a first chroma component, and a second chroma component. In converting the RAW image, the pre-processor 210 can apply a demosaic algorithm to generate the color image from incomplete color samples output from an image sensor overlaid with a color filter array (CFA), e.g., a Bayer filter array.

In various implementations, the pre-processor 210 performs additional processing of the color image. The pre-processor 210 can apply gain to the color image, where high gain is applied in low-light conditions and low gain is applied in high-light conditions. The pre-processor 210 can white balance (or otherwise color correct) the color image, applying different gains to different color components depending on illumination and illuminant type. The pre-processor 210 can blur, sharpen, or otherwise filter the color image. The pre-processor 210 can compress the image with either lossy or lossless compression.

Thus, in various implementations, the output of the pre-processor is a color image including a plurality of color components, e.g., multiple matrices of pixels. Each matrix of pixels (itself an "image") is fed into a multiplexer 220. The multiplexer 220 multiplexes each color component into a plurality of frequency band components. For example, the multiplexer 220 can multiplex a red component into a low frequency red component and a high frequency red component. As another example, the multiplexer 220 can multiplex a luma component into a very low frequency luma component, a low frequency luma component, a high frequency luma component, and a very high frequency luma component. In some embodiments, such as when the color image is an RGB image, the multiplexer 220 can multiplex each component. In some embodiments, such as when the color image is a YCbCr image, the multiplexer 220 can multiplex only one of the components, e.g., the luma component, and not multiplex the other components, e.g., the chroma components.

In various implementations, the multiplexer 220 downsamples lower frequency components, e.g., components other than the highest frequency component. For example, the multiplexer 220 can down-sample the low frequency red component by 2 and not down-sample the high frequency red component. As another example, the multiplexer can down-sample the very low frequency luma component by 8, down-sample the low frequency luma component by 4, down-sample the high frequency luma component by 2, and not down-sample the very high frequency component.

Accordingly, in various implementations, the output of the multiplexer 220 is a plurality of frequency components, e.g., multiple matrices of pixels, for at least one of a plurality of color components. Each matrix of pixels (itself an "image") is fed into a feature generator 230. The feature generator 230 determines a feature value of each pixel of a received image (which, as described above, may be a component of an image). The feature value represents edge information of the pixel, e.g., a first derivative or a second derivative. In particular, the feature value indicates on which side of an edge a pixel is located.

In various implementations, the feature value is a Laplacian of Gaussian (LoG) feature value. Accordingly, in various implementations, the LoG feature value for a pixel is determined as the convolution of an LoG kernel with an image region surrounding the pixel, e.g., a 3×3, 5×5, or 7×7 neighborhood with the pixel at the center. In various implementations, the feature value is based on other edge detection methods, such as Canny, Difference of Gaussians, Harris, etc.

Figure 3:
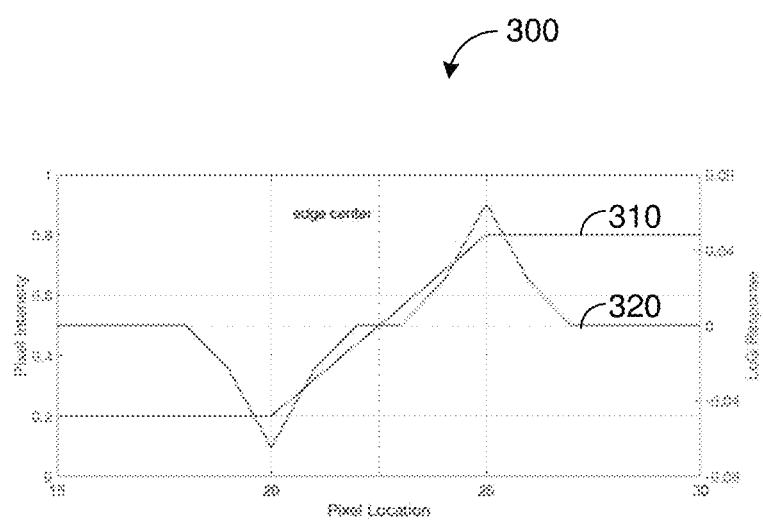
FIG. 3 illustrates the LoG response curve of a 1D edge input.

FIG. 3 illustrates the LoG response curve of a 1D edge input. FIG. 3 includes a plot 300 of an example 1D edge 310 and the LoG response curve 320 of the 1D edge 310. The 1D edge 310 transitions from a first pixel intensity (e.g., 0.2) to a second pixel intensity (e.g., 0.8) over a region of approximately five pixels. The sign of LoG response curve 320 indicates the relative location of the current pixel with respect to the nearby edge center: positive values suggest that the pixel is on the higher intensity side and negative values suggest that the pixel is on the lower intensity side. Accordingly, an LoG feature value indicates on which side of an edge a particular pixel is located.

Referring again to FIG. 2, the output of the feature generator 230 is, for each received image (which may be a component of an image), the received image itself and feature values for each pixel of the image. These outputs are fed into a denoiser 240. Thus, in various implementations, the denoiser 240 receives a plurality of images, each being a frequency component of a color component of an image that has been decomposed. With each of the plurality of images, the denoiser 240 receives a feature value of each pixel.

For at least one of the received images, the denoiser 240 denoises pixels of the image based on the feature values. In various implementations, the denoiser 240 denoises a target pixel by selecting pixels from candidate pixels in an image region surrounding the target pixel and, choosing as the new value for the target pixel, the average of the values of the selected pixels.

In various implementations, a candidate pixel is selected as a selected pixel if the difference between the value of the target pixel, denoted $x_t$, and the value of the candidate pixel, denoted $x_c$, is less than a threshold, denoted $\tau$.

Thus, in various implementations, a candidate pixel is selected as a selected pixel if:

$$|x_c - x_t| < \tau$$

In various implementations, an adjusted target pixel value is determined based on the value of the target pixel and the feature value of the target pixel, denoted $F_t$. For example, in various implementations, the adjusted target pixel value is determined as the sum of the target pixel value and some function of the feature value, denoted $f(F_t)$. In various implementations, a candidate pixel is selected as a selected pixel if the difference between the adjusted target pixel value and the value of the candidate pixel value is less than a threshold.

Thus, in various implementations, a candidate pixel is selected as a selected pixel if:

$$|x_c - (x_t + f(F_t))| < \tau$$

In various implementations, the function of the feature value is the feature value multiplied by a tuning parameter. In various implementations, the tuning parameter is selected, based on the feature value, as one of a plurality of predetermined tuning parameters. Accordingly, in various implementations, the feature value is quantized into one of a plurality of feature value classes, each of the feature value classes associated with a respective tuning parameter. In various implementations, the tuning parameters are determined off-line with supervised learning to determine the optimal value for each class. The tuning parameter can also take multiple profiles in adapting to various scenes, lighting conditions, camera settings, and artistic preference. Accordingly, in various implementations, the tuning parameter is based on lighting conditions.

Thus, in various implementations, where ac is the tuning parameter for a feature value class determined based on quantization of the feature value, a candidate pixel is selected as a selected pixel if:

$$|x_c - (x_t + \alpha_c F_t)| < \tau$$

In various implementations, the threshold is based on a noise value of the target pixel derived from a noise model such as the noise model described in U.S. patent application Ser. No. 14/474,103, filed Aug. 30, 2014, and herein incorporated by reference in its entirety. As a larger threshold mitigates isolated pixel artifacts and smooth edges as compared to a lower threshold, increasing the threshold where noise is expected due to a noise model most strongly mitigates this noise when it most expected.

Figure 4:
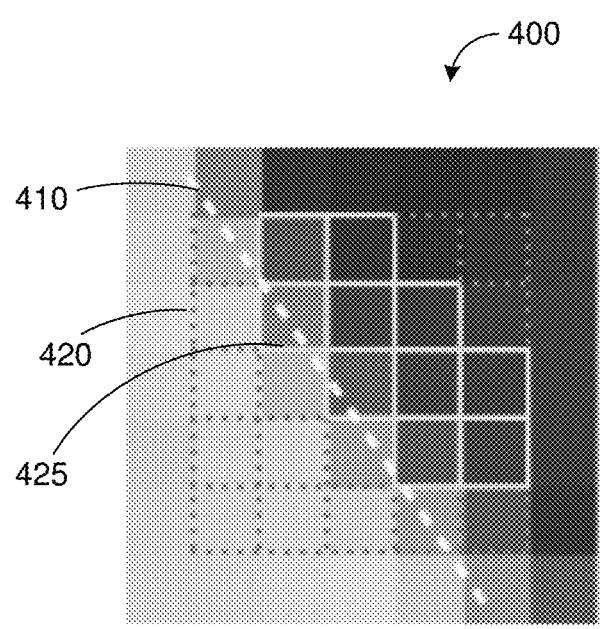
FIG. 4 illustrates an image region surrounding a particular pixel at the center of the image region.

FIG. 4 illustrates an image region 400 surrounding a particular pixel at the center of the image region 400. The image region 400 represents an edge 410. The image region 400 includes a set of candidate pixels, each having respective candidate pixel values. The image region 400 indicates a set of selected pixels (a subset of the candidate pixels) selected based on the feature value of the particular pixel. As illustrated in FIG. 4, the particular pixel is located on one side of the edge 410. Further, the set of selected pixels includes those candidate pixels on the same side of the edge 410 which have similar candidate pixel values to the pixel value of the particular pixel.

The output of the denoiser 240 is, for each received image (which may be a component of an image), a denoised image. These outputs are fed into a demultiplexer 250. The demultiplexer combines the received denoised images to create a composite image that is fed into the post-processor 260. The post-processor 260 can perform similar functions as the pre-processor, including filtering and color correction. The output of the post-processor 260 is a processed image which can be stored or displayed.

In various implementations, the post-processor 260 applies a local-variance-driven sharpening. In various implementations, denoising based on an LoG feature value is more effective in high-contrast regions. Further, in various implementations, denoising based on an LoG feature value introduces halo artefacts into the denoised image resulting in an unnatural look-and-feel.

Accordingly, in various implementations, the post-processor 260 decomposes the denoised image, denoted I, into a high-frequency component, denoted $I_H$, and a low-frequency component, denoted $I_L$. In various implementations, the high-frequency component is determined by subtracting the low-frequency component from the denoised image, e.g.:

$$I_H = I - I_L$$

In various implementations, the post-processor 260 determines the low-frequency component as the result of low-frequency filtering with kernels such as mean-filter, or other more sophisticated filtering method of choice (for example, self-guided filter) depends on the desired frequency characteristics.

The post-processor 260 generates a detail-modulation image, denoted $I_M$, based on the high-frequency component. In particular, for a particular pixel of the high-frequency component at horizontal location x and vertical location y, denoted $I_H(x,y)$, the post-processor 260 determines a local variance, denoted $\sigma(x,y)$, of the neighborhood surrounding the particular pixel. Where t is a tuning parameter, the post-processor 260 determines the value for a corresponding pixel of the detail-modulation image as:

$$I_M(x, y) = \frac{t}{t + \sigma(x, y)} I_H(x, y)$$

Further, the post-processor 260 generates an output image, denoted $I_O$, by adding a scaled version of the detail-modulation image to the original denoised image. Thus, where β is a scaling factor, $$I_O = I + \beta I_M$$

Figure 5:
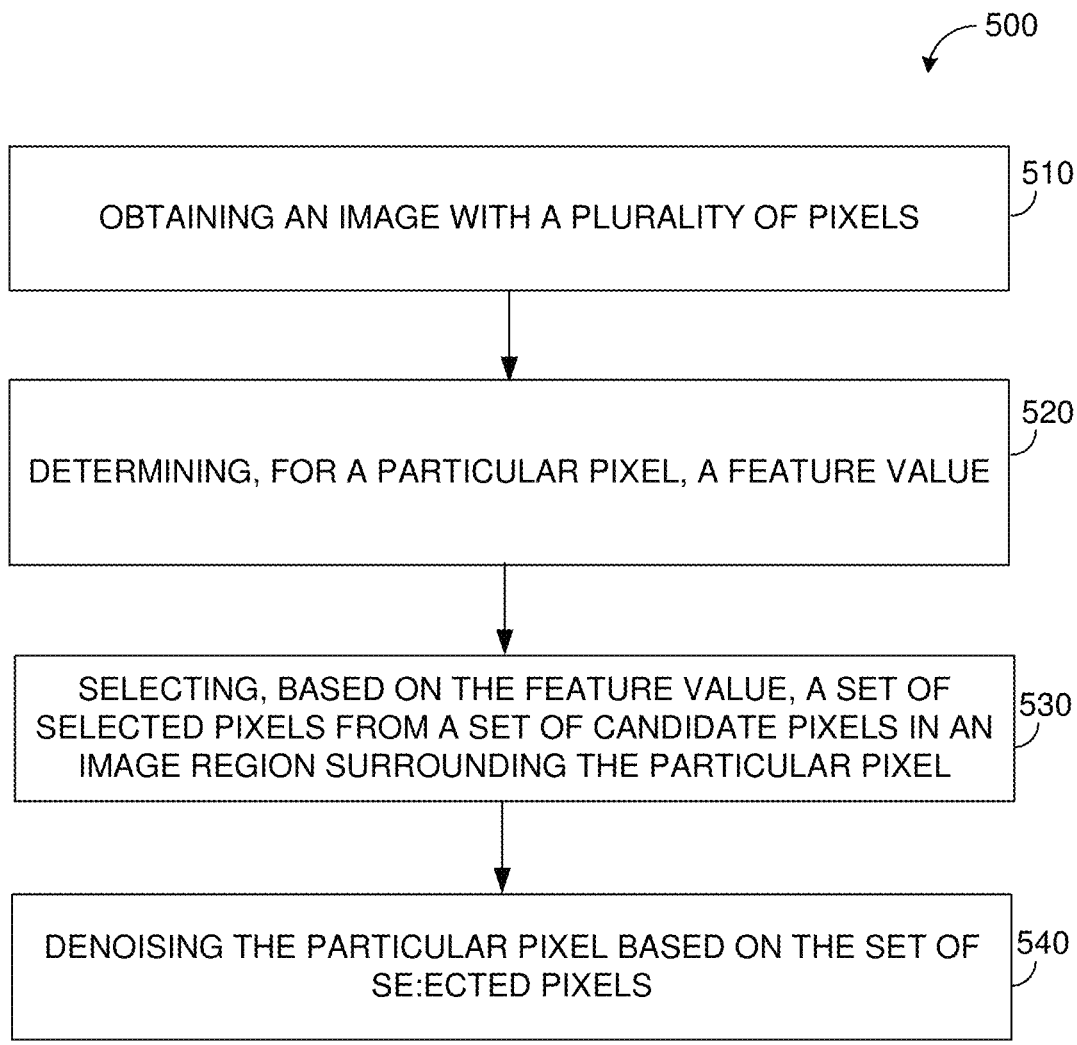
FIG. 5 is a flowchart representation of a method of denoising an image in accordance with some implementations.

FIG. 5 is a flowchart representation of a method 500 of denoising an image in accordance with some implementations. In some implementations (and as detailed below as an example), the method 500 is performed by an image processing system (or a portion thereof), such as the image processing system 200 of FIG. 2. In some implementations, the method 500 is performed by a general processor, such as the general processor 108 of FIG. 1. In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, the method 500 includes determining a feature value of a particular pixel and denoising the pixel based on the feature value.

The method 500 begins, at block 510, with the image processing system obtaining an image comprising a plurality of pixels. In various implementations, the image processing system obtains the image from an image sensor, such as the image sensor 102 of FIG. 1, an image processor, such as the image processor 104 of FIG. 1, storage, such as the storage 106 of FIG. 1, a pre-processor, such as the pre-processor 210 of FIG. 2, or a multiplexer, such as the multiplexer 220 of FIG. 2.

In various implementations, the image is a color component of an RGB image (or frequency component thereof). Thus, in some embodiments, the method 500 includes obtaining a RAW image and converting the RAW image into an RGB image consisting of a red component, a blue component, and a green component. In various implementations, the image is a luma component of a YCbCr image. Thus, in some embodiments, the method 500 includes obtaining a RAW image and converting the RAW image into a YCbCr image consisting of a luma component, a first chroma component, and a second chroma component. In various implementations, the method 500 includes converting an RGB image into a YCbCr image.

In various implementations, the image is a frequency component of a wideband image. Thus, in some embodiments, the method 500 includes obtaining a wideband image (which can be a color component of a color image including a plurality of color components, such as a luma component or a green component). The method 500 can further include multiplexing the wideband image to produce a plurality of frequency band components. The method 500 can further include down-sampling at least one of the plurality of frequency band components (e.g., all except the frequency band component containing the highest frequencies of the wideband image). In some embodiments, the image is a down-sampled one of the plurality of frequency components.

In various implementations, the image takes other forms, such as a grayscale image, a RAW image, or a compressed image.

The method 500 continues, at block 520, with the image processing system determining, for a particular pixel of the plurality of pixels, a feature value. Although the following steps of the method 500 are described as generally being performed on a particular pixel, it is to be appreciated that the method 500 can be performed on many pixels of the image, including all the pixels of the image. In various implementations, pixels at the edges of an image are processed differently than pixels in the middle of the image.

Further, although the method 500 can be performed on a single component of a multi-component image (e.g., a frequency component and/or a color component), it is to be appreciated that the method 500 can be performed on multiple components, including all of the components. However, in some embodiments, the method 500 is performed on the pixels of a luma component of an YCrCb image, but not performed on the chroma components of the YCrCb image.

In various implementations, the image processing system determines the feature value by determining a Laplacian of Gaussian (LoG) feature value by convolving an LoG kernel with an image region surrounding the pixel. The feature value represents edge information of the pixel, e.g., a first derivative or a second derivative. In various implementations, the feature value indicates on which side of an edge the pixel is located.

The method 500 continues, at block 530, with the image processing system selecting, based on the feature value, a set of selected pixels from a set of candidate pixels in an image region surrounding the particular pixel. In various implementations, the set of candidate pixels includes the pixels a 5×5 neighborhood surrounding the particular pixel. In various implementations, the set of candidate pixels includes the pixels in a 7×7 neighborhood surrounding the particular pixel.

In various implementations, the image processing system selects the set of selected pixels by determining an adjusted pixel value based on the pixel value of the particular pixel and the feature value of the particular pixel. For example, in various implementations, determining the adjusted pixel value includes adding the pixel value of the particular pixel to the product of the feature value of the particular pixel and a tuning parameter. In various implementations, the tuning parameter is based on the feature value. For example, in various implementations, the tuning parameter is selected, based on a quantization of the feature value, from a plurality of predefined tuning parameters. In various implementations, the tuning parameter is based on lighting conditions of the image.

In various implementations, the image processing system selects the particular candidate pixel as a selected pixel in response to determining that the difference between the pixel value of the candidate pixel and the adjusted pixel value is less than a threshold. In various implementations, the threshold is based on a noise value of the particular pixel derived from a noise model.

The method 500 continues, at block 540, with the image processing system denoising the particular pixel based on the set of selected pixels. In various implementations, the image processing system denoises the particular pixel by averaging the pixel values of the set of selected pixels. In various implementations, the averaging is a weighted averaging, the weights being based on the feature value. In denoising the particular pixel, the image processing system determines a denoised value for the particular pixel. The denoised value can be used as the value for a corresponding pixel of a denoised image.

As noted above, the method 500 can be performed on many pixels of the image, including all the pixels of the image, and multiple components of a multi-component image. In various implementations, the image processing system generates a denoised image based on denoising the particular pixel (and other pixels of the image and/or other components).

In various implementations, the image processing system applies a post-processing sharpening to the denoised image. In particular, in various implementations, the image processing system decomposes the denoised image into a low-frequency component and a high-frequent component. The image processing system generates a detail-modulation image based on the high-frequency component and local variances of the high-frequency component. The image processing system generating a post-processed image by adding, to the denoised image, a scaled version of the detail-modulation image.

Figure 6:
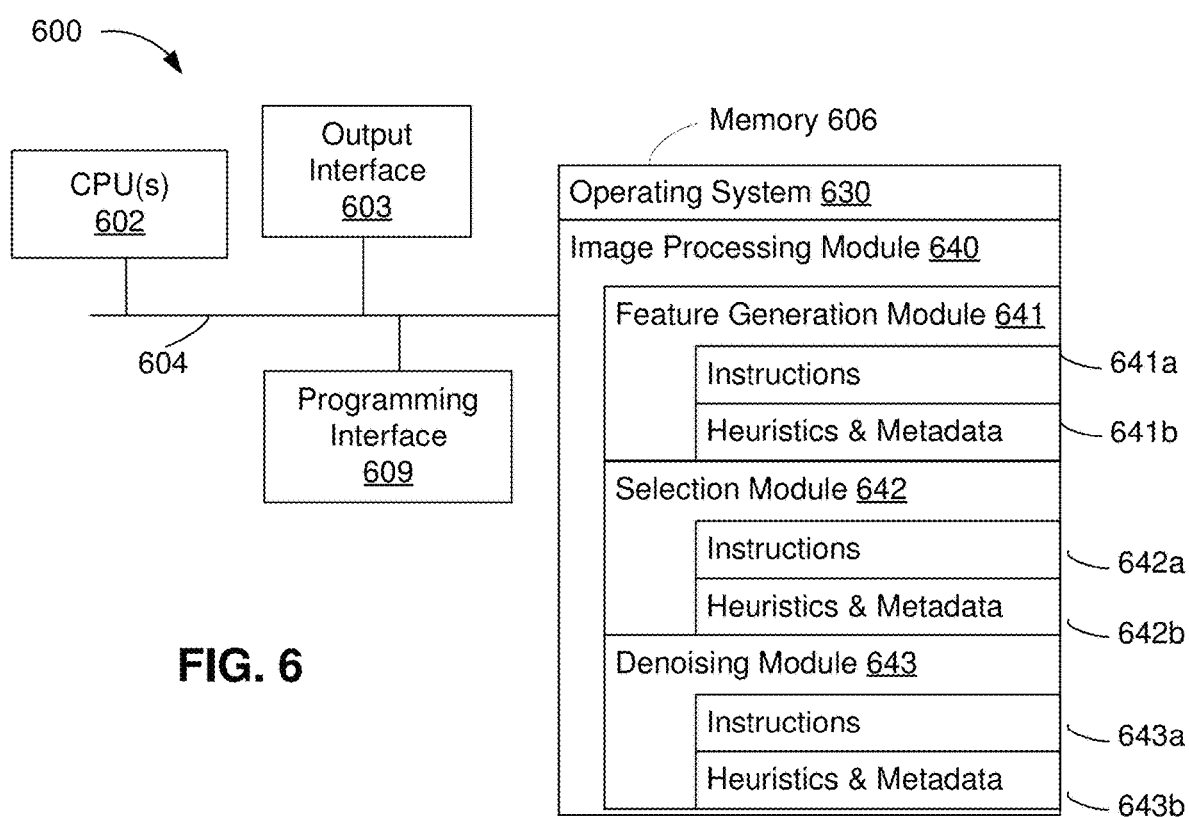
FIG. 6 is a block diagram of a computing device in accordance with some implementations.

FIG. 6 is a block diagram of a computing device 600 in accordance with some implementations. In some implementations, the computing device 600 corresponds to the at least a portion of the electronic device 100 of FIG. 1 and performs one or more of the functionalities described above with respect to the electronic device. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 600 includes one or more processing units (CPU's) 402 (e.g., processors), one or more input/output interfaces 603 (e.g., a network interface and/or a sensor interface), a memory 606, a programming interface 609, and one or more communication buses 604 for interconnecting these and various other components.

In some implementations, the communication buses 604 include circuitry that interconnects and controls communications between system components. The memory 606 includes high-speed random access memory, such as DRAM, SRAM, DDR RAM or other random access solid state memory devices; and, in some implementations, include non-volatile memory, such as one or more magnetic disk storage devices, optical disk storage devices, flash memory devices, or other non-volatile solid state storage devices. The memory 606 optionally includes one or more storage devices remotely located from the CPU(s) 602. The memory 606 comprises a non-transitory computer readable storage medium. Moreover, in some implementations, the memory 606 or the non-transitory computer readable storage medium of the memory 606 stores the following programs, modules and data structures, or a subset thereof including an optional operating system 630 and an image processing module 640. In some implementations, one or more instructions are included in a combination of logic and non-transitory memory. The operating system 630 includes procedures for handling various basic system services and for performing hardware dependent tasks. In some implementations, the image processing module 640 is configured to denoise an image. To that end, the image processing module 640 includes a feature generation module 641, a selection module 442, and a denosing module 643.

In some implementations, the feature generation module 641 is configured to determine, for a particular pixel of a plurality of pixels of an obtained image, a feature value. To that end, the feature generation module 641 includes a set of instructions 641a and heuristics and metadata 641b. In some implementations, the selection module 642 is configured to selecting, based on the feature value, a set of selected pixels from a set of candidate pixels in an image region surrounding the particular pixel. To that end, the selection module 642 includes a set of instructions 642a and heuristics and metadata 642b. In some implementations, the denoising module 643 is configured to denoise the particular pixel based on the set of selected pixels. To that end, the denoising module 643 includes a set of instructions 643a and heuristics and metadata 643b.

Although the image processing module 640, the feature generation module 641, the selection module 642, and the denoising module 643 are illustrated as residing on a single computing device 600, it should be understood that in other embodiments, any combination of the image processing module 640, the feature generation module 641, the selection module 642, and the denoising module 643 can reside in separate computing devices in various implementations. For example, in some implementations each of the image processing module 640, the feature generation module 641, the selection module 642, and the denoising module 643 reside on a separate computing device or in the cloud.

Moreover, FIG. 6 is intended more as functional description of the various features which are present in a particular implementation as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs or GP-GPUs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    obtaining an image comprising a plurality of pixels;
    determining, for a particular pixel of the plurality of pixels, a feature value that indicates on which side of an edge the particular pixel is located;
    determining, for the particular pixel, an adjusted pixel value based on a pixel value of the particular pixel and the feature value of the particular pixel;
    selecting, based on the feature value, a set of selected pixels from a set of candidate pixels in an image region surrounding the particular pixel in response to determining that a difference between pixel values of the set of selected pixels and the adjusted pixel value is less than a threshold; and
    denoising the particular pixel based on the set of selected pixels.

2. The method of claim 1, wherein determining the feature value comprises determining a Laplacian of Gaussian (LoG) feature value by convolving an LoG kernel with an image region surrounding the pixel.

3. The method of claim 1, wherein the threshold is based on a noise value of the particular pixel derived from a noise model.

4. The method of claim 1, wherein determining the adjusted pixel value includes adding the pixel value of the particular pixel to the product of the feature value of the particular pixel and a tuning parameter.

5. The method of claim 4, wherein the tuning parameter is based on the feature value.

6. The method of claim 5, wherein the tuning parameter is selected, based on a quantization of the feature value, from a plurality of predefined tuning parameters.

7. The method of claim 1, wherein denoising the particular pixel based on the set of selected pixels includes averaging the set of selected pixels.

8. The method of claim 7, wherein averaging the set of selected pixels includes determining a weighted average of pixel values of the set of selected pixels.

9. The method of claim 1, further comprising:
    generating a denoised image based on denoising the particular pixel;
    decomposing the denoised image into a low-frequency component and a high-frequency component;
    generating a detail-modulation image based on the high-frequency component and local variances of the high-frequency component; and
    generating a post-processed image by adding, to the denoised image, a scaled version of the detail-modulation image.

10. A non-transitory computer-readable medium having instructions encoded thereon that, when executed by one or more processors of an electronic device, cause the electronic device to perform a method comprising:
    obtaining an image comprising a plurality of pixels;
    determining, for a particular pixel of the plurality of pixels, a feature value that indicates on which side of an edge the particular pixel is located;
    determining, for the particular pixel, an adjusted pixel value based on a pixel value of the particular pixel and the feature value of the particular pixel;
    selecting, based on the feature value, a set of selected pixels from a set of candidate pixels in an image region surrounding the particular pixel in response to determining that a difference between pixel values of the set of selected pixels and the adjusted pixel value is less than a threshold; and denoising the particular pixel based on the set of selected pixels.

11. The non-transitory computer-readable medium of claim 10, wherein determining the feature value comprises determining a Laplacian of Gaussian (LoG) feature value by convolving an LoG kernel with an image region surrounding the pixel.

12. The non-transitory computer-readable medium of claim 10, wherein the threshold is based on a noise value of the particular pixel derived from a noise model.

13. The non-transitory computer-readable medium of claim 10, wherein determining the adjusted pixel value includes adding the pixel value of the particular pixel to the product of the feature value of the particular pixel and a tuning parameter.

14. The non-transitory computer-readable medium of claim 13, wherein the tuning parameter is based on the feature value.

15. The non-transitory computer-readable medium of claim 14, wherein the tuning parameter is selected, based on a quantization of the feature value, from a plurality of predefined tuning parameters.

16. The non-transitory computer-readable medium of claim 10, wherein denoising the particular pixel based on the set of selected pixels includes averaging the set of selected pixels.

17. The non-transitory computer-readable medium of claim 10, wherein the method further comprises:
generating a denoised image based on denoising the particular pixel;
decomposing the denoised image into a low-frequency component and a high-frequency component;
generating a detail-modulation image based on the high-frequency component and local variances of the high-frequency component; and
generating a post-processed image by adding, to the denoised image, a scaled version of the detail-modulation image.

18. A system comprising:
a non-transitory memory; and
one or more processors configured to:
obtain an image comprising a plurality of pixels;
determine, for a particular pixel of the plurality of pixels, a feature value that indicates on which side of an edge the particular pixel is located;
determine, for the particular pixel, an adjusted pixel value based on a pixel value of the particular pixel and the feature value of the particular pixel;
select, based on the feature value, a set of selected pixels from a set of candidate pixels in an image region surrounding the particular pixel in response to determining that a difference between pixel values of the set of selected pixels and the adjusted pixel value is less than a threshold; and
denoise the particular pixel based on the set of selected pixels.

19. The method of claim 1, wherein the selecting comprises selecting the set of selected pixels such that the set of selected pixels includes a subset of the set of candidate pixels that is on the same side of the edge as the particular pixel.

* * * * *